Feb. 13, 1973  R. J. LA FOLLETTE  3,716,853
AIRBORNE RADAR DETECTING AND RECORDING SYSTEM
Filed Nov. 13, 1969  7 Sheets-Sheet 1

Fig_1

Fig_2

Fig_3

Fig_4

INVENTOR
ROBERT L. LA FOLLETTE
BY
ATTORNEY

Fig_8

CODE OUTPUT LOGIC LEVELS FOR BAND CODES

| BAND | 315° | 135° |
|---|---|---|
| LOW BAND | HIGH | LOW |
| MID BAND | LOW | HIGH |
| HIGH BAND | HIGH | HIGH |
| NO VIDEO | LOW | LOW |

Fig_9

Fig_10

Fig_11

INVENTOR
ROBERT L. LA FOLLETTE

Feb. 13, 1973  R. J. LA FOLLETTE  3,716,853
AIRBORNE RADAR DETECTING AND RECORDING SYSTEM
Filed Nov. 13, 1969  7 Sheets-Sheet 7

Fig_12

INVENTOR
ROBERT L. LA FOLLETTE
BY
Harvey C. Lanthurst
ATTORNEY

United States Patent Office

3,716,853
Patented Feb. 13, 1973

3,716,853
AIRBORNE RADAR DETECTING AND RECORDING SYSTEM
Robert J. La Follette, Santa Clara, Calif., assignor to Itek Corporation, Lexington, Mass.
Filed Nov. 13, 1969, Ser. No. 876,275
Int. Cl. G01s 7/04
U.S. Cl. 343—5 PR                                9 Claims

ABSTRACT OF THE DISCLOSURE

A radar detection and recording system for providing a permanent record of certain data regarding radar signals detected during an airborne mission and including means for subsequently reproducing said data. A signal analyzer responsive to a radar detection means analyzes the detected signals and divides them into component signals which are suitable for driving an azimuth indicator means. The component signals are sampled and modified by an interfacing means which converts the signals normally used to energize the indicator means into a coded form suitable for recording on a plural channel magnetic recording device. The recorded signals may then subsequently be utilized to reconstruct the signals originally used to drive the airborne indicator means.

BACKGROUND OF THE INVENTION

The present invention relates generally to airborne radar detection apparatus and, more particularly, to a novel system for detecting and selectively recording enemy radar signals encountered during the course of an airborne mission. The system also includes a novel means for subsequently reproducing the recorded signals.

Although means are known for detecting and informing the pilot of a high speed aircraft that his aircraft is under radar surveillance and for indicating the relative signal strength and heading to the source there has heretofore not been available any practical means for recording these signals because of the high rate at which the signals are necessarily received and displayed. Although video recording apparatus is presently available which is capable of recording megacycle rate signals of the type detected by such systems, this apparatus is necessarily, unreliable and quite sensitive to environmental disruptions. In other words, state of the art video recording mechanisms are impractical for use in high speed military aircraft.

One attempt to record the CRT display provided to the pilot of an aircraft during a mission was to use a motion picture system which photographically recorded the face of the display tube continuously during the mission. This method, however, was not considered practical because of the many variables and general physical limitations which affect any photographic apparatus, in addition to the lack of suitable space in the aircraft. Since it it highly desirable that the locations and characteristics of enemy radar installations be known, it is now regarded as quite important that a practical means be provided for recording the detected radar information presented to the pilot during a mission.

Moreover, such means would be of great value in evaluating friendly or commercial radar systems such as those used in modern all weather aircraft location and guidance systems. A system of the type described would, for example, enable a mapping of radar signal strengths to be made in radar controlled air spaces so that an effectiveness evaluation of a given radar network could be easily made.

OBJECTS OF THE PRESENT INVENTION

It is therefore a primary object of the present invention to provide a novel airborne radar detection and recording system for electronically recording detected radar signals.

Another object of the present invention is to provide a novel radar receiving system having means for electronically recording certain characteristics of the radar signals received.

Still another object of the present invention is to provide a novel radar signal recording system for electronically evaluating and recording on magnetic tape selected radar data received by airborne radar receiver apparatus.

Still another object of the present invention is to provide a novel radar signal recording and playback system including an airborne recording unit and a playback unit which may be used at any subsequent time to faithfully reproduce the radar display presented to the pilot during a given mission.

Still another object of the present invention is to provide a novel airborne radar survey tool which can be used to record radar signal strengths over a given geographical area so that a given radar system can be mapped or otherwise evaluated.

SUMMARY OF THE INVENTION

The present invention relates to a radar detection and recording system which enables an airborne multi-channel magnetic recording apparatus to be utilized to record selected radar signals. A signal analyzer analyzes the signals received by a radar receiver and divides them into component signals which are suitable for driving an azimuth indicator. The component signals are then recorded simultaneously on the several tracks of a multi-track magnetic recording device. In order to enable the simultaneous recording of the four component indicator driving signals, an interface means is provided responsive to these four signals for converting them into waveforms which are suitable for recording on a plural channel magnetic recording device. The interface means includes a system for coding certain ones of the signals so as to enable subsequent reproduction of the signals to be accurately made during playback.

The system also includes a magnetic playback unit including an interfacing system for accommodating the tape skew differentials which are inherent in any multi-channel recording apparatus.

Among the principal advantages of the present invention is that a relatively small and compact electronic recording apparatus is provided for recording radar signals encountered by an airborne aircraft. The system, however, does not require the use of a complex state of the art video recording device. Furthermore, the system is capable of providing an accurate reproduction of the control panel indication which was presented to the pilot during a given mission.

The many advantages of the present invention will become apparent to those skilled in the art after having read the following detailed disclosure of a preferred embodiment of the invention which makes reference to the several figures of the drawings.

DESCRIPTION OF THE PREFERRED EMBODIMENT

Figure 1:
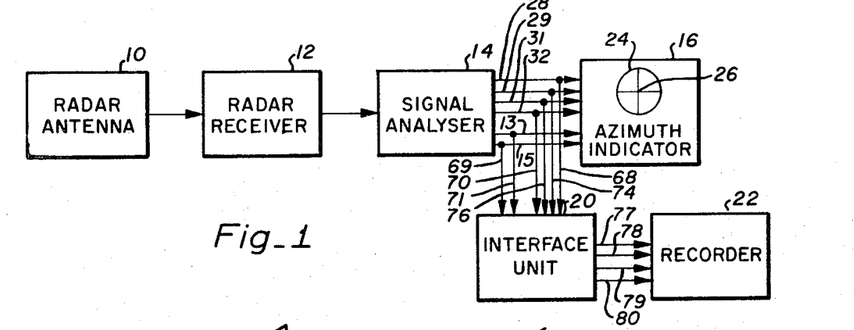
FIG. 1 is a simplified block diagram of an airborne radar detection and recording system in accordance with the present invention.

Referring now to FIG. 1 of the drawing, a block diagram of an airborne radar detection, indication and recording system in accordance with the present invention is shown. The system includes a radar antenna array 10 that is coupled to a radar receiver 12 which detects radar signals received by the antenna 10. Antenna 10 consists of four radar antennas mounted so as to receive signals from the four azimuthal quadrants of the carrying aircraft. The output of the receiver 12 is fed into a signal analyzer 14 which is capable of selecting detected radar signals appearing in certain frequency bands and developing indicator driving signals for driving the azimuth indicator 16. The driving signals include azimuthal component signals (deflection video) which are coupled into indicator 16 through the lines 28-32 to drive the deflection circuits of indicator 16, and indicator coding signals (unblanking pulses) which are coupled into indicator 16 through lines 13 and 15. In response to these signals the signal intensity and heading of certain ones the detected radar signals are displayed. The coding signals designate within which of several frequency bands a particular detected radar signal is included and are in the form of a series of pulses which drive unblanking circuits in indicator 16. The indicator driving signals are in the form of ramp or sawtooth shaped signals pulses 18, such as is illustrated in FIG. 2, and have ramp angles $\theta$ which are proportional to the magnitude of the corresponding azimuthal component of the detected radar signal.

Figures 2, 3:
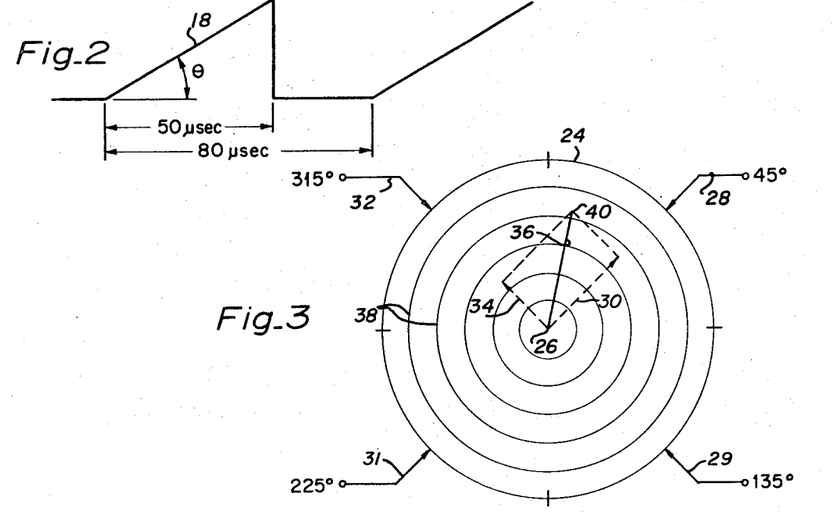
FIG. 2 illustrates the form of a quadrature component signal used to drive the in-cockpit indicator apparatus of the present invention.
FIG. 3 is a diagramatic representation of the azimuthal indicator apparatus utilized in a preferred embodiment of the present invention.

Each indicator driving signal corresponds to one of the various azimuthal coordinates (45°, 135°, 225°, and 315°) and the component signals corresponding to a particular radar source are simultaneously fed into two of the four sweep drive inputs of indicator 14 so as to cause a vector sum of the two signals to be displayed on the face 24 of a cathode ray tube as indicated in FIG. 3. The displayed trace radiates from the center 26 of the tube face 24, and the radial in which the trace lies indicates the azimuthal position of the detected radar source relative to the aircraft. The length of the trace indicates the intensity of the signal received. Should the transmitter power of the detected radar source be known, the distance to the source could also be determined from the length of the trace.

For example, a signal applied to the 45° input terminal 28 alone would produce a trace such as that indicated by the dashed line 30, while a signal applied to the 315° input terminal 32 alone would produce a trace such as that shown at 34. However, when both signals are simultaneously input to terminals 28 and 32 the trace produced will be equivalent to the vector sum of 30 and 34 and will appear as that indicated at 36. The pilot can thus determine from the display that the enemy radar source lies on a bearing of approximately 8° relative to his present course and by referring to the circular range lines nearest the end 40 of the trace determine that the strength of the detected signal is so many units, or if the approximate transmitter power is known he can determine that the source is approximately $x$ miles away. Apparatus of the type illustrated in blocks 10, 12, 14 and 16 is embodied in such prior art systems as the Model AN/APR-25 Radar Detection System, manufactured by the assignee of the present invention.

Unlike the high frequency radar pulses detected by the receiver 12, the pulses produced by the analyzer 14 in response thereto could possibly be recorded on a magnetic tape recorder of limited band width since their repetition period is at least 80 $\mu$sec. But because four individual output signals must be produced simultaneously in order to cover the four azimuthal quadrants, a four track recording is required. To record these signals directly onto a magnetic tape would not be satisfactory because of the inability of the recorder to precisely record the exact sawtooth waveform i.e., since all multichannel tape recorders are subject to skewing inaccuracies, it would be extremely difficult to obtain a simultaneous playback of the quadrature components required to accurately develop the desired indication.

Therefore, in accordance with the present invention, a novel recording means is provided including an interface unit 20 and a multi-channel recorder 33. Interface unit 20 converts the sawtooth pulses into encoded signals in the form of rectangular pulses having amplitudes proportional to the ramp angles $\theta$ of the sawtooth pulses (see FIG. 2) and these pulses are then recorded on the respective channels of the recorder 22. These pulses may be made quite wide, for example, 80 $\mu$sec. or less, and thus easily recordable since the repetition period of the sawtooth pulses is never less than 80 $\mu$sec. In such case, even though the waveform per se which can subsequently be reproduced from the recording is not exact, the pulse height is substantially correct over the length of the pulse and thus, although the tape skew causes the various channel outputs to be slightly displaced in time, a sampling of these signals taken during a period of overlap, can be used to reconstruct the ramp-type waveforms required to drive an equivalent of the azimuth indicator 16. In order to insure that all four channels will have a period of overlapping signals, steps must be taken into insure that the skew error of the recorder is less than a predetermined percentage of the width of the pulses so that accurate samplings can be made of the four channels regardless of such skew error. Prior art means for providing such skew correction are well known.

Figure 4:
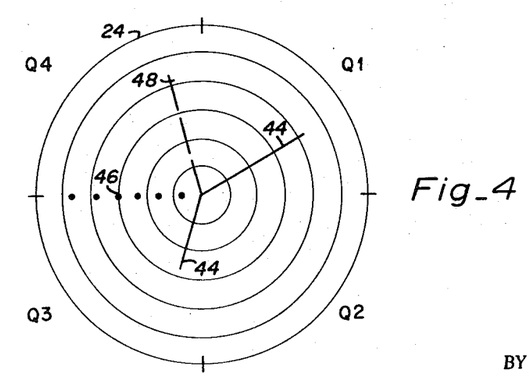
FIG. 4 is a diagramatic representation of an azimuthal indicator apparatus showing the manner in which signals received in several frequency bands are displayed.

The azimuth indicator, as shown in FIG. 4, displays traces 44-48 on the face 24 of a cathode ray tube which indicates the bearing, relative to aircraft heading of each received radar signal. As mentioned above, the bearing is indicated by the angular position of the trace, and the length of the trace provides a relative measure of signal strength, but does not necessarily provide true distance-to-source information. As mentioned above the traces are coded in a suitable manner to indicate the frequency bands of the detected radars. In the illustrated preferred embodiment, for example, signals in a first radar frequency band, referred to as the Lo-band are displayed as solid traces 44, while signals in a second band, referred to as the Mid-band are represented by six discrete dots 46, and signals in a third band, referred to as the Hiband are shown as three discrete equal length dashes 48. Since the traces are displayed at the scan rate of the received radar, they will flicker or remain steady according to the type of radar being received. The encoding of the traces is accomplished by periodically enabling (unblanking) the electron gun of the CRT of indicator 16 during its sweep cycle so that the resultant display is in the form of dots 46, dashes 48, or solid lines 44, as indicated in FIG. 4. The coding signals (high unblank and coded unblank) are developed by analyzer 14 and are input to indicator 16 through the lines 13 and 25.

Figure 5:
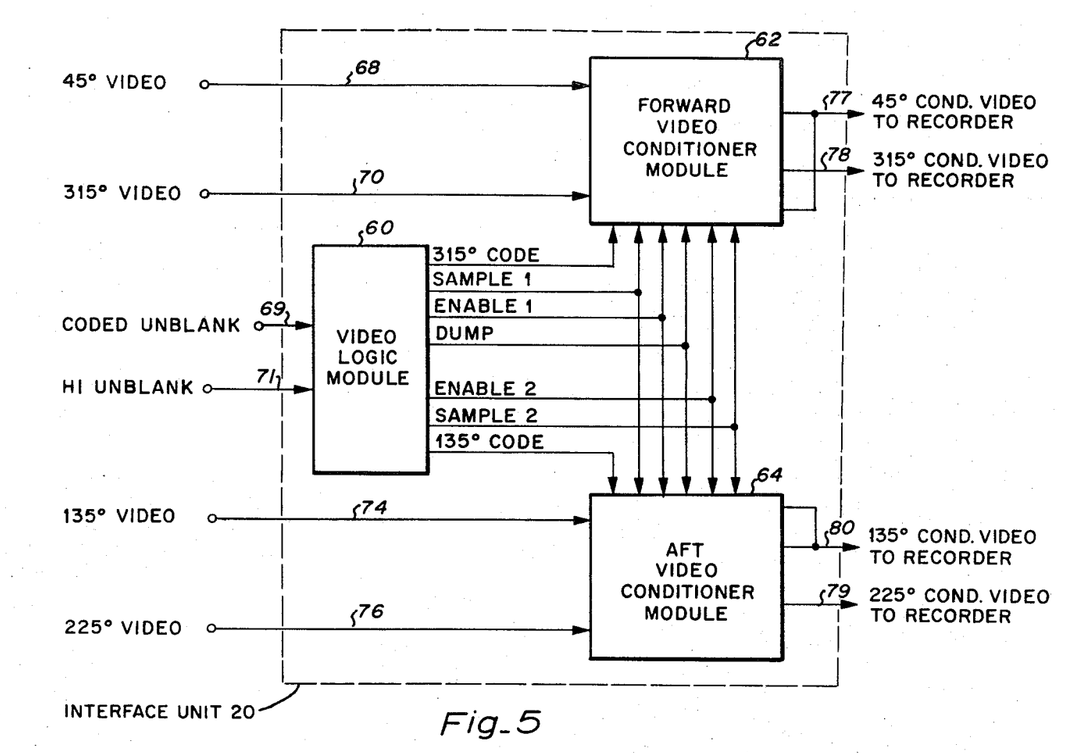
FIG. 5 is a simplified block diagram of a recording interface apparatus in accordance with the present invention.

Turning now to FIG. 5 of the drawing, a functional block diagram of a preferred embodiment of the interface unit 20 is illustrated. This unit is basically comprised of three modules including a video logic module 60, and a pair of video conditioner modules 62 and 64. The video logic module 60, in response to the coded unblank signals developed by analyzer 14, generates the control signals for the video conditioner modules 62 and 64 which samples the deflection video data in the azimuthal component signals produced by analyzer 14 and transforms the sampled data into a form which can be received by the recorder 22 as will be explained in more detail below.

The 45° and 315° component signals from two of the outputs of analyzer 14 are coupled into the module 62 on the lines 68 and 70 respectively, and are sampled thereby. Similarly, the aft module 64 receives the 135° deflection signals on line 74 and the 225° deflection signals on line 76 and samples these signals as controlled by module 60.

The video logic module 60 receives the coded unblank and high unblank signals from analyzer 14 on the two input lines 69 and 71 respectively, as indicated. From these inputs, the code and control signals for the video conditioner modules 62 and 64 are generated. Although the coded unblank signal and the high unblank signal could be separately recorded on separate recording channels, the preferred method is to utilize portions of two of the four quadrature signal recording channels for containing the encoding information. The code signals are supplied to each video conditioner module from the video logic module 60, in order to enable an identification to be made of the frequency band of the signal being monitored, and appear on the 315° output line 78 of the forward module 62, and the 135° output line 80 of the aft module 64.

Figure 8:
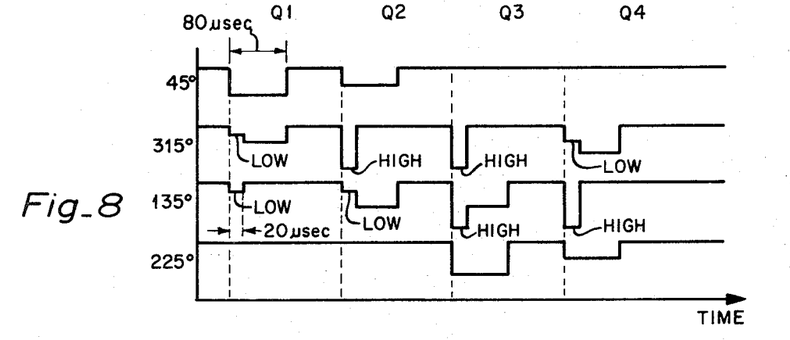
FIG. 8 is a diagram illustrating exemplary waveforms of the type presented to the four recording channels by the interfacing apparatus of the present invention.
Figure 9:
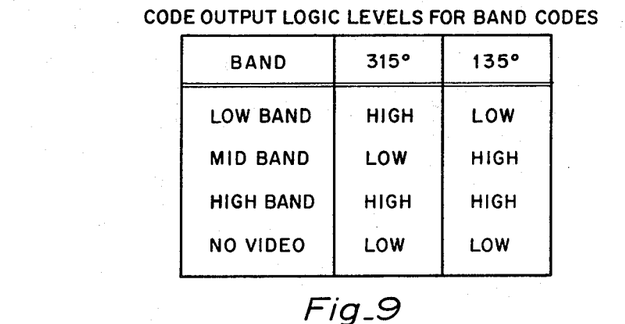
FIG. 9 is a table illustrating the code logic levels utilized to encode the recorded signals as to frequency band.

As described below with reference to FIGS. 6A, 8, 9, the codes are in the form of high and low level logic pulses which determine the frequency band being monitored. Command signals in the form of enable, sample and dump pulses are also developed by module 60 and are supplied to both video modules in a definite sequence. In response to the enable and sample pulses received from module 60, the deflection video appearing on any of the four lines 68, 70, 74 and 76 is sampled, stretched and processed by the respective video conditioner modules before being applied to the four input channels of recorder 22 through lines 77–80. When the sample period for each video conditioner module terminates, dump pulses are applied to the pulse stretcher circuit of each conditioner module to clear them of any residual stored data in preparation for the next sample sequence.

Figure 6:
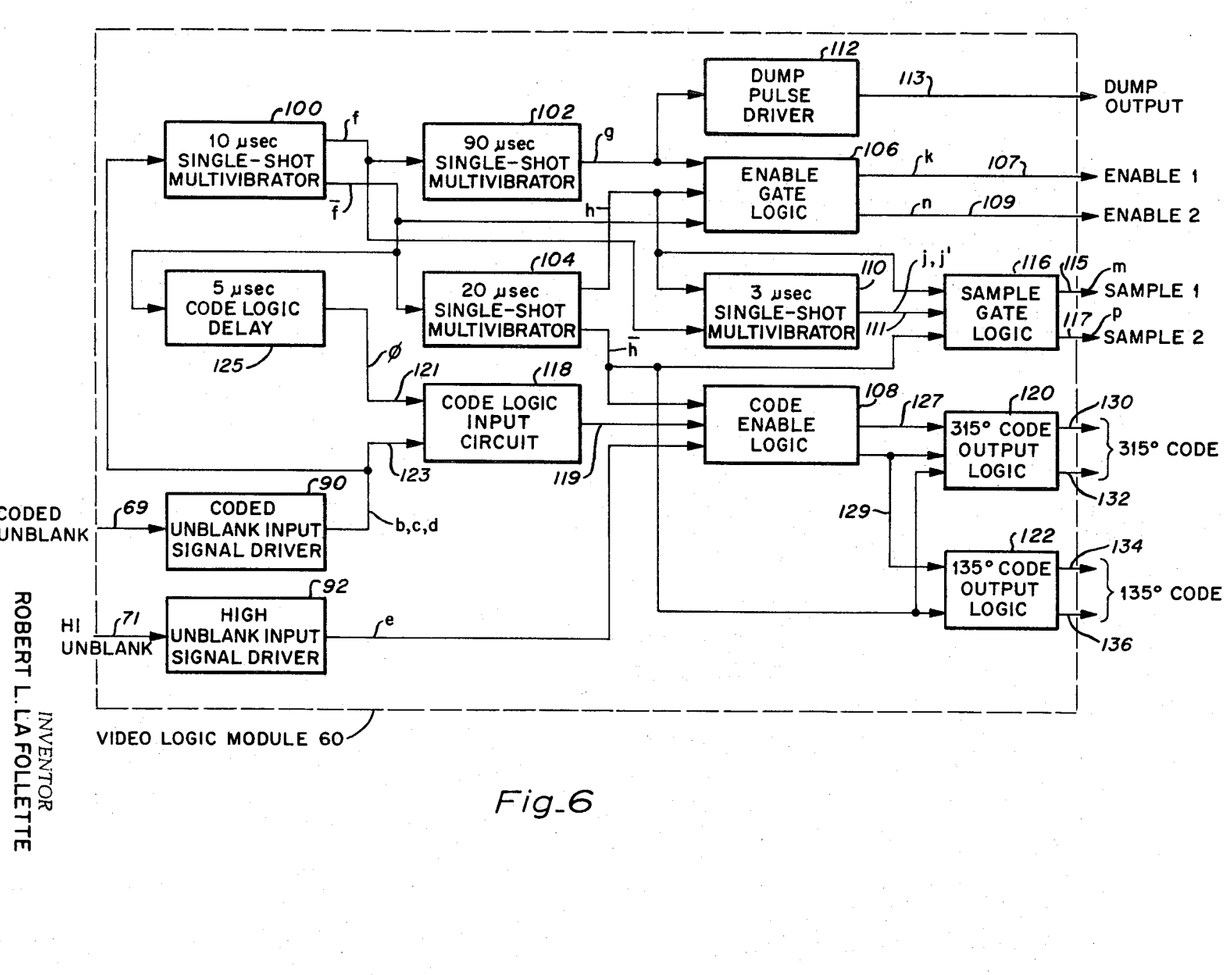
FIG. 6 is a function block diagram of the video logic component of the preferred interface embodiment illustrated in FIG. 5.
Figure 6A:
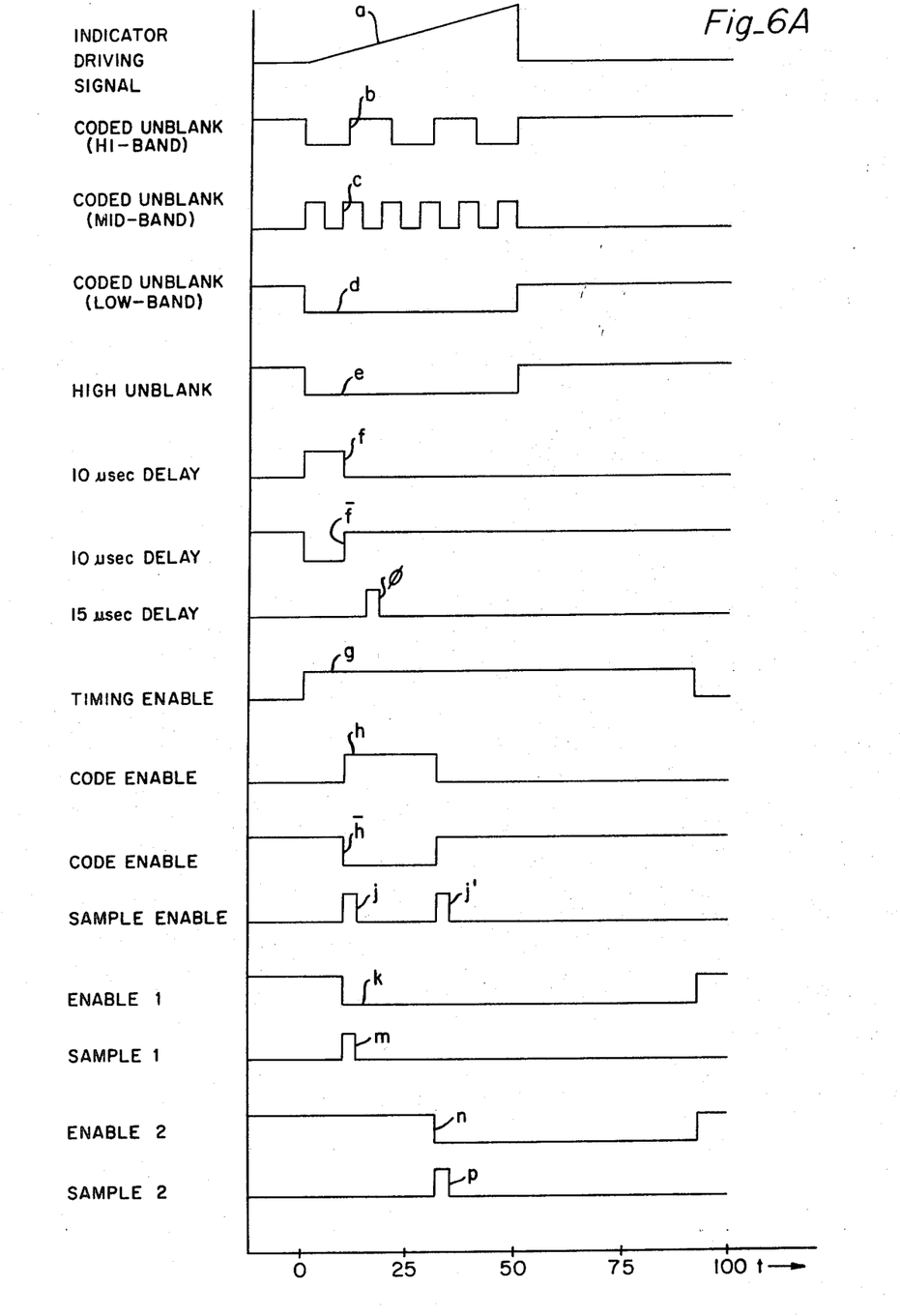
FIG. 6A is a diagram illustrating timing waveforms at various points in the video logic component illustrated in FIG. 6.

Reference is now made to FIG. 6, which is a functional block diagram of the video logic module 60, and to FIG. 6A, which is a timing diagram illustrating, in terms of various generalized wave forms, the operation of module 60. As the ramp shaped pulses ($a$) are input to the forward and aft video conditioner modules 62 and 64, respectively, the corresponding coded unblank signal ($b$), ($c$) or ($d$), developed by analyzer 14 on line 15 is input to a signal driver 90 through the line 69. Signal drivers 90 and 92 are essentially comprised of level shifting circuits for adjusting the input unblanking signals to appropriate signal levels.

Following level shifting the coded unblank signal is applied to a single shot multi-vibrator 100 which, upon sensing the leading edge of the first coded unblank pulse, develops a 10 $\mu$sec. pulse ($f$) and a similar inverted pulse ($\bar{f}$). Pulse ($f$) is used to provide a 10 $\mu$sec. delay before the video logic module begins to perform its timing function. More specifically, the positive going transition of pulse ($f$) triggers a timing enable multi-vibrator 102 which in turn develops a timing enable pulse ($g$) of 90 $\mu$sec. duration. In response to the pulse ($\bar{f}$) the code enable multi-vibrator 104 develops a 20 $\mu$sec. pulse ($h$) and a similar inverted pulse ($\bar{h}$).

As indicated by the output lines from multi-vibrators 100, 102 and 104, various combinations of the pulses ($f$), ($\bar{f}$), ($g$), ($h$) and ($\bar{h}$) are applied to the enable gate logic 106, the code enable logic 108 and the dual input, single-shot multi-vibrator 110. The enable gate logic 106 includes a first NAND gate which develops an 80 $\mu$sec. ENABLE 1 pulse ($k$) on line 107 when ($\bar{f}$) and ($g$) are both high. Pulse ($k$) forms a command signal which enables the 45° and 225° deflection signal sampling gates of the video conditioner modules 62 and 64. ENABLE gate logic 106 also includes a second NAND gate which, after a 20 $\mu$sec. delay, develops an ENABLE 2 signal ($n$) on line 109 when ($g$) and ($\bar{h}$) are both high. The delay between the start of the ENABLE 1 and ENABLE 2 pulses allows 20 $\mu$sec. for the band coding function to be performed as will be described below. The ENABLE 2 pulse, which is 60 $\mu$sec. in duration, is likewise applied to video conditioner modules 62 and 64 and permits the 315° and 135° deflection signals to be sampled. The negative going transition of pulse ($g$) triggers dump pulse driver 112, which in turn produces a positive going dump pulse on line 113 for application to video conditioner modules 62 and 64 to clear them of any stored video levels.

Multi-vibrator 110 includes a pair of input circuits which are OR'd together to drive a single-shot multi-vibrator which develops a first 3 $\mu$sec. pulse ($j$) on line 111 as pulse ($f$) goes low, and a second 3 $\mu$sec. pulse ($j'$) on line 111 as pulse ($h$) goes low.

Sample gate logic 116 includes a first NAND gate which develops a 3 $\mu$sec. SAMPLE 1 pulse ($m$) on line 115 when pulses ($h$) and ($j$) are both high, and a second NAND gate which develops a 3 $\mu$sec. SAMPLE 2 pulse ($p$) on 117 when pulses ($\bar{h}$) and ($j'$) are high. The SAMPLE 1 pulse is applied to video conditioner modules 62 and 64 to cause them to SAMPLE the 45° deflection signal and 225° deflection signal respectively, and the SAMPLE 2 pulse ($p$) is applied to video conditioner modules 62 and 64 to cause them to sample the 315° deflection signal and 135° deflection signal respectively.

Code logic input circuit 118 includes a J-K flip-flop which responds to a clock pulse $\phi$ (generated by code logic delay 125) on line 121 5 $\mu$sec. after the occurrence of the leading edge of ($\bar{f}$) and to the coded unblank signal on line 123, and develops an output on line 119 which is high when the mid-band code ($c$) is input, and low when the high-band or low-band codes are input. Code enable logic 108 responds to the signal developed on line 119, the high unblank signal ($e$), and ($\bar{h}$) to develop, during the time that ($\bar{h}$) is low, logic output signals on lines 123 and 129 which are high or low as indicated in the following table.

| ($h$) | Line 119 | ($e$) | Line 127 | Line 129 |
|---|---|---|---|---|
| Low | Low | Low | High | High. |
| Low | Low | High | do | Low. |
| Low | High | Low | Low | Low. |
| Low | do | High | Low | High. |

The purpose of code logic circuit 118 and enable logic 108 is to permit the use of a two bit band code on lines 127 and 129 for identifying one of the three possible code bands. The 315° code output logic 120 and 135° code output logic 122 respectively convert the logic levels on lines 127 and 129 to corresponding band code analog levels on output lines 130 and 134. This output logic also buffers enable signal ($\bar{h}$) onto output lines 132 and 136 for use as a band code enable pulse.

Figure 7:
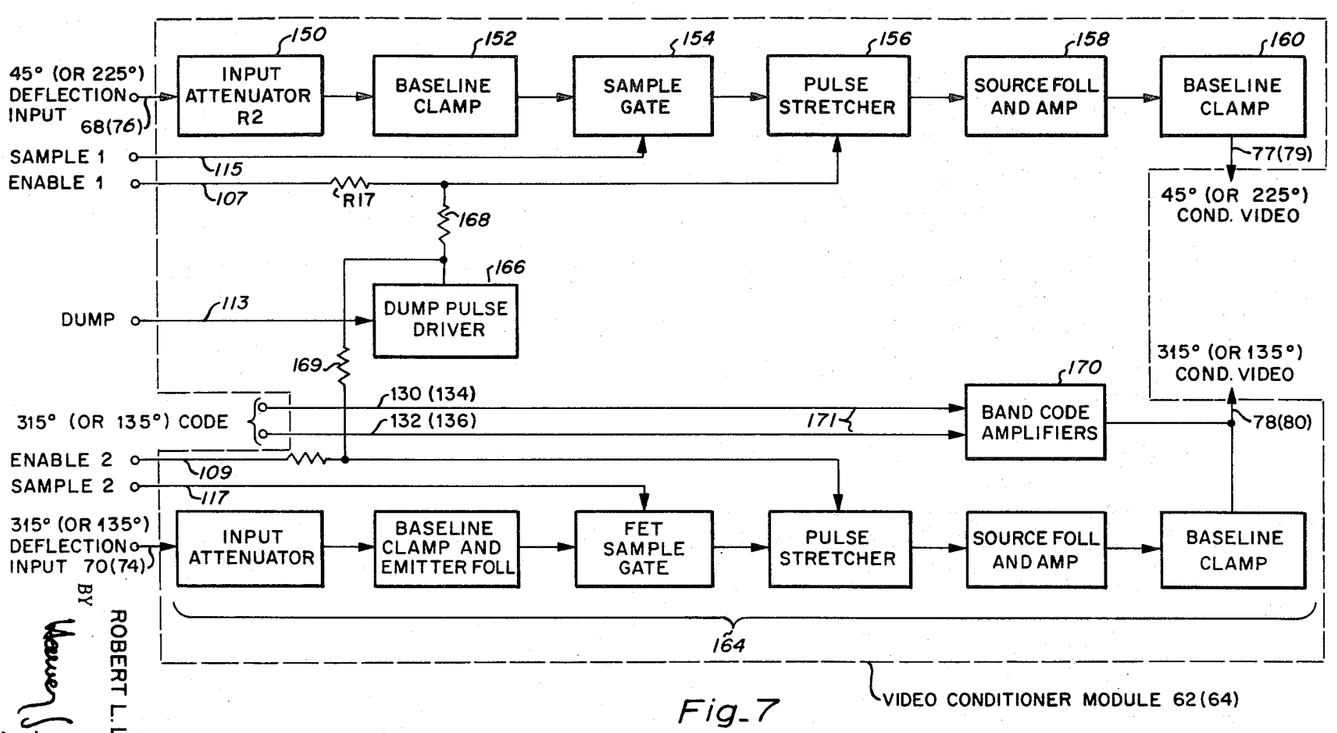
FIG. 7 is a functional block diagram of the video conditioner components of the preferred interface embodiment illustrated in FIG. 5.

Referring now to FIG. 7 of the drawing, a functional block diagram of the video conditioner modules 62 and 64 will be described. However, since each module is functionally identical to the other, only the module 62 is actually illustrated, although corresponding call-out numbers for module 64 are shown in parenthesis. Module 62 samples and stretches the deflection video signals received on lines 68 and 70, and the enable, sample and dump signals are applied to the conditioner module from the video logic module 60 through lines 107 and 109, 115 and 117, and 113 respectively. The band code signals and code enable signals are input on lines 130 and 132. In response to these various input signals, module 62 develops encoded signals—a 45° conditioned video output signal on line 77, and a 315° band coded and conditioned video signal on line 78—for application to the recorder 22.

More particularly, the 45° deflection signal is applied to the input attenuator 150 on line 68, directly from the corresponding output line of analyzer 14. After attenuation, the ramp shaped input signal is clamped by base line clamp 152 and applied to sample gate 154. The SAMPLE 1 pulse ($m$) from video logic module 60 is applied to gate 154 on line 115 to cause sampling of the input signal for 3 $\mu$sec. The resultant 3 $\mu$sec. sampling level is then applied to a pulse stretcher 156. In time coincidence with the sampling operation, the ENABLE 1 pulse ($k$) from video logic module 60 is applied to pulse stretcher 156 causing the sampled level to be stretched and stored by pulse stretcher 156 for approximately 80 $\mu$sec. The stretched output is then applied to the source follower/amplifier 158 for isolation. The amplified signal is subsequently applied through a base-line clamp circuit 160 and line 77 to recorder 22 as the 45° conditioned video signal (encoded signal).

The sample and stretch circuit 164 for the 315° input deflection video is identical to that for the 45° signal except that the band-code signals are generated during the first 20 $\mu$sec. of the 80 $\mu$sec. period and are accordingly followed by sample and stretch periods of 60 $\mu$sec., i.e., the deflection data containing pulse is of 60 $\mu$sec. duration instead of 80 $\mu$sec. duration as in the 45° circuit. This difference is effected by the 20 $\mu$sec. delay between the SAMPLE 1 and SAMPLE 2 pulses ($m$) and ($p$) respectively, which are illustrated in FIG. 6A. When the sample and stretch periods end, the dump pulse developed by video logic module 60 is fed through driver 166 and resistors 168 and 169 to clear the pulse stretchers of any data levels left from the previous sample cycle.

The band code and band code-enable signals developed by video logic module 60 are applied through the lines 130 and 132 respectively, to the band-code amplifier 170. Depending upon the level of the band code signal, a high or low level code will be applied to the 315° conditioned video signal during the code-enable interval (the first 20 $\mu$sec. of the 80 $\mu$sec. timing period). In FIG. 8 of the drawing, a diagram is shown to illustrate exemplary encoded signals of the type developed at the output terminals 77, 78, 79 and 80 of the interface unit 20 for application to recorder 22. As was pointed out above, the deflection signal period is 80 $\mu$sec. in duration. The illustrated encoded signals in the 45° and 225° channels are negative going square wave pulses of 80 $\mu$sec. duration and are amplitude modulated to correspond to the ramp angles $\theta$ of the respective deflection video component signals. The encoded signals in the 135° and 315° channels are negative going composite pulses having amplitudes during the first 20 $\mu$sec. which correspond to a particular band code level and amplitudes during the remaining 60 $\mu$sec. which correspond to the ramp angles $\theta$ of the respective deflection video component signals. The band code logic levels for the various operating modes are indicated in the table shown in FIG. 9.

Figure 10:
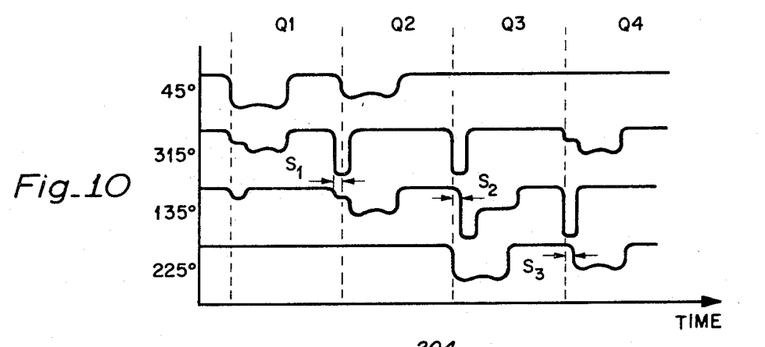
FIG. 10 is a diagram illustrating exemplary waveforms of the type which might be reproduced in response to a recording of the waveforms illustrated in FIG. 8.

In addition to showing the form of the encoded signals, signal pairs are chosen to illustrate typical signals of the type which would be capable of causing azimuth indication to be developed in quadrants Q1, Q2, Q3 and Q4 respectively, of the normal azimuthal quadrants of the aircraft (see FIG. 4). Although the signals for each quadrant Q are simultaneously recorded on four channels of the recorder 22, the recorded signals will be subject to certain inaccuracies caused by the skew characteristics of both the recorder and playback devices. For example, in addition to the rounding off of the rectangular input wave forms caused by the response inaccuracies of the recording mechanism, the various channels may be variably shifted in time (skewed) with respect to each other. Thus, in order to obtain an accurate reproduction of the recorded data, simultaneous samplings of the four channels must be made during an interval when the amplitudes of the signals in each of the four channels are simultaneously correct. This sampling period is preferably chosen to start 50 $\mu$sec. after the start of each cycle so as to fall at about the middle of the 60 $\mu$sec. signal periods. An exemplary diagram of a recorded playback of the signals of FIG. 8 is shown in FIG. 10 to illustrate the effect of recorder/playback skew. Note the time shifts between the signals in the various channels.

Figure 11:
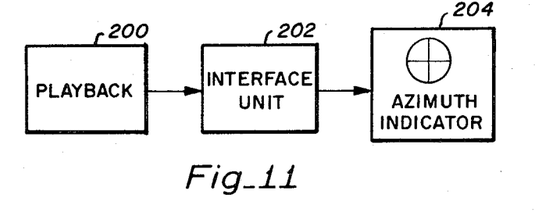
FIG. 11 is a simplified block diagram of a playback system in accordance with the present invention.

Although the airborne unit described above may also be equipped to provide for playback of the recorded signals, i.e., interface unit 20 may be equipped to convert the recorded data back into its original form for driving indicator 16, the primary purpose of the present invention is to record in-flight data for study following completion of the mission. Thus, to enable subsequent playback of the recorded data, a ground playback system is provided having the principle components illustrated in FIG. 11. This system includes a playback unit 200, an interface unit 202, and an azimuth indicator 204. The playback unit 200 may be of similar construction to the airborne recorder apparatus and selected to be of such quality as to have skew characteristics within certain pre-determined limits, typically of 30 $\mu$sec. or less. The azimuth indicator 204 is also generally similar to the airborne azimuth indicator 16. However, the interface unit 202 differs from the previously described airborne interface unit 20 in that it must convert the encoded signals back into the original ramp-voltage configurations. A preferred embodiment of interface unit 202 is illustrated in simplified block diagram form in FIG. 12 of the drawing.

Figure 12:
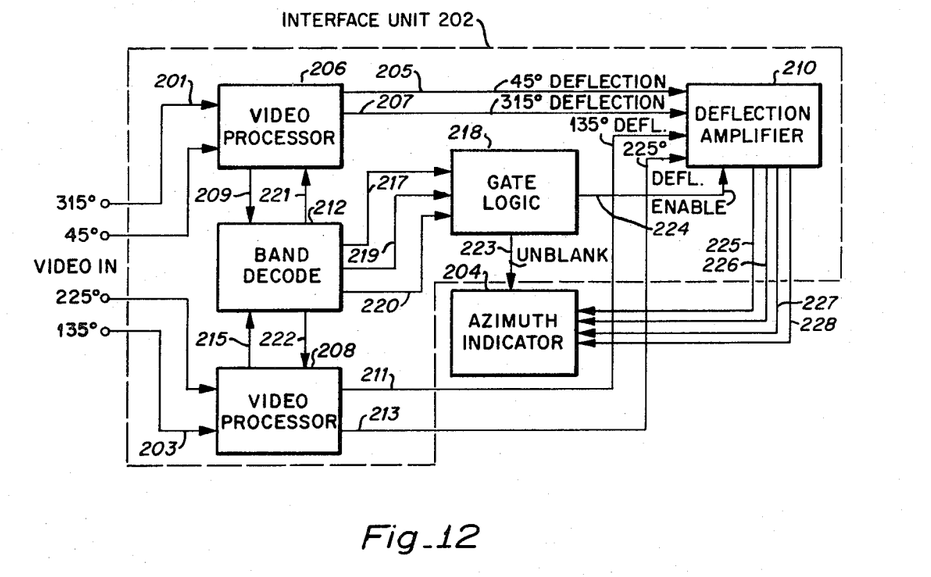
FIG. 12 is a functional block diagram of the playback interfacing unit of a playback system in accordance with the present invention.

Referring now to FIG. 12, the reproduced video signals from the 45° and 315° channels of the playback apparatus 200 (FIG. 11) are input into the video conditioner 206 of interface unit 202, and the 135° and 225° conditioned video signals are input into the video processor 208. Processor 206 receives and processes the encoded 45° and 315° video signals and provides 45° and 315° deflection signals in analog form for output on lines 205 and 207, and 315° high or low code threshold signals on line 209. Processor 208 receives and processes the encoded 225° and 135° video signals, and provides 135° and 225° deflection signals in analog form for output on lines 211 and 213, and 135° high or low code threshold signals on line 215.

More specifically, video processor 206 detects the beginning of a recorded pulse on the 315° input line 201, and during the first 20 $\mu$sec. of the pulse, determines the band code level, i.e., high or low. It then provides the threshold decision to the band-decode unit 212 in terms of a logic high or low on line 209. Video processor 208 simultaneously serves the same function with regard to the band code on the 135° input line 203 and provides the threshold decision to band decode unit 212 in terms of a logic high or low on line 215. In response to the logic input on lines 209 and 215, band decode unit develops corresponding logic on its output lines 217 and 219 for input to the gate logic 218. The various combinations of logic on lines 217 and 219 determine the band of the recorded input signals.

Depending upon the logic states of the signals on lines 217 and 219, gate logic 218 will develop unblank pulses on line 223 which correspond to the pulses (b), (c) and (d), illustrated in FIG. 6A. At approximately 50 μsec. following the first detection of a pulse on the video input lines 201 and 203, band decode unit 212 develops sample pulses of approximately 3 μsec. duration on lines 221 and 222 which cause video processors 206 and 208 to sample and hold any input video on the four input lines. As pointed out above, the 50 μsec. delay is chosen to lessen the chance that any skew error will be introduced. In other words, since the recorder 200 is selected to have a tape skew of less than 30 μsec. and the encode period occupies the first 20 μsec. of the recorded pulses (on the 135° and 315° channels), a sampling of the recorded data at a point 50 μsec. into the cycle will tend to insure a high level of sampling and reproduction accuracy.

In addition to generating unblanking signals for the azimuth indicator 204, gate logic 218 develops a sweep enable signal on line 224 for input to the deflection amplifier 210. In response to the enable signal, amplifier 210 generates ramp voltages on lines 225–228 having slopes proportional to the amplitudes of the encoded signals input thereto on lines 205, 207, 211 and 213. At this point the deflection signals developed on lines 225–228 are substantially identical to the original signals which were input to the onboard azimuth indicator 16 in the aircraft, and azimuth indicator 204 responds thereto to develop a display of the type illustrated in FIG. 4. In other words, the ramp voltages developed on lines 225–228 determine the location of the signal trace and the unblank signal on line 223 encodes the trace by switching the electron beam of CRT ON and OFF in response to the unblank signal.

In accordance with the system described above, the signals which are reproduced on the azimuth indicator 204 pursuant to playback of a magnetic recording made during an airborne mission will be substantially identical to the display which was presented to the pilot during the mission. The recorded data can thus be utilized to provide substantial information concerning radar signals encountered during the mission. For example, by knowing the aircraft's course and speed vs. time profile, enemy radars can be accurately pinpointed on a map of the area. Similarly, where it is desirable that the effectiveness or saturation of a given radar airspace be known, the apparatus of the present invention can be used to obtain an aerial survey of the navigable airspace by simply flying over some predetermined traverse through the airspace in question and using the recorded data to construct a radar contour map of the area.

Although not shown herein, the apparatus of the present invention may also include certain test circuitry as well as other types of attack alarm devices or threat display means. Furthermore, such apparatus may also be used as a data storage or information delay means from which a computerized evasive action or retaliatory system could be actuated. It is contemplated that after having read the above disclosure of a preferred embodiment many alterations, modifications and other uses of the present invention will become apparent to those skilled in the art. It is therefore to be understood that this description is for purposes of illustration only and is in no way intended to be limiting. Accordingly, it is intended that the appended claims be interpreted as covering all modifications which fall within the true spirit and scope of the invention.

What is claimed is:

1. A radar detection and recording system, comprising:
   a radar receiver responsive to radar signals and operative to develop output signals commensurate therewith;
   a signal analyzer responsive to said output signals and operative to develop indicator driving signals commensurate therewith, said indicator driving signals including azimuth component signals and band coding signals;
   interfacing means responsive to said driving signals and operative to develop encoded signals, said interfacing means including, logic means responsive to said band coding signals and operative to develop command signals, and signal conditioning means responsive to said command signals and operative to convert said component signals into said encoded signals; and
   a recorder responsive to said encoded signals and operative to develop a permanent record thereof.

2. A radar detection and recording system as recited in claim 1 wherein said component signals are in the form of ramp voltages having ramp angles proportional to the intensity of a corresponding azimuthal component of a detected radar signal, and wherein said conditions means includes means for sampling said component signals and developing said encoded signals in the form of squarewave pulses having amplitude proportional to said ramp angles.

3. A radar and detection recording system as recited in claim 1 wherein said logic means further includes means responsive to said band coding signals and operative to develop band code pulses having amplitudes commensurate with a particular encoding scheme.

4. A radar detection and recording system as recited in claim 3 wherein, said component signals are in the form of ramp voltages having ramp angles proportional to the intensity of a corresponding azimuthal component of a detected radar signal, said conditioning means includes means for sampling said component signals and developing said encoded signals in the form of squarewave pulses having amplitudes proportional to said ramp angles, and said conditioning means further includes means for adding said band code pulses to certain ones of said square wave pulses in a predetermined manner.

5. In a radar detection and recording system including, radar detecting means responsive to radar signals and operative to develop indicator driving signals including azimuthal component signals and band coding signals, an indicator responsive to said driving signals and operative to develop an encoded visual display commensurate with the detected radar signals, and recording means for developing a record of the detected radar signals, an improved recording means comprising:
   interfacing means responsive to said driving signals and operative to develop encoded signals commensurate therewith, said interfacing means including, logic means responsive to said band coding signals and operative to develop command signals, and signal conditioning means responsive to said command signals and operative to convert said component signals into said encoded signals; and
   means for receiving said encoded signals and operative to provide a record thereof.

6. In a radar detection and recording system as recited in claim 5 wherein said component signals are in the form of ramp voltages having ramp angles proportional to the intensity of a corresponding azimuthal component of a detected radar signal, and wherein said conditioning means includes means for sampling said component signals and developing said encoded signals in the form of squarewave pulses having amplitudes proportional to the ramp angles of the corresponding component signals.

7. In a radar detection and recording system as recited in claim 5 wherein said logic means further includes means responsive to said band coding signals and operative to develop band code pulses having amplitudes commensurate with a particular encoding scheme.

8. In a radar detection and recording system as recited in claim 7 wherein said component signals are in the form of ramp voltages having ramp angles proportional to the intensity of a corresponding azimuthal component of a detected radar signal, and wherein said conditioning means includes, means for sampling said component signals and developing said encoded signals in the form of squarewave pulses having amplitudes proportional to the ramp angles of the corresponding component signals, and means for adding said band code pulses to at least one of said squarewave pulses in a predetermined manner.

9. In a radar detection and recording system as recited in claim 5 wherein said interfacing means includes playback means for converting previously recorded encoded signals into driving signals for driving the indicator.

References Cited

UNITED STATES PATENTS

| 2,907,029 | 9/1959 | O'Meara et al. | 343—113 |
| 3,075,190 | 1/1963 | Laporte | 343—5 PC |
| 3,546,696 | 12/1970 | Waters et al. | 343—5 PC |

T. H. TUBBESING, Primary Examiner

U.S. Cl. X.R.

343—18 E, 113 R